May 29, 1934.  E. G. LOOMIS  1,960,708
MEANS FOR CRUSHING VISCOUS AND OTHER SUBSTANCES
Filed Dec. 8, 1928
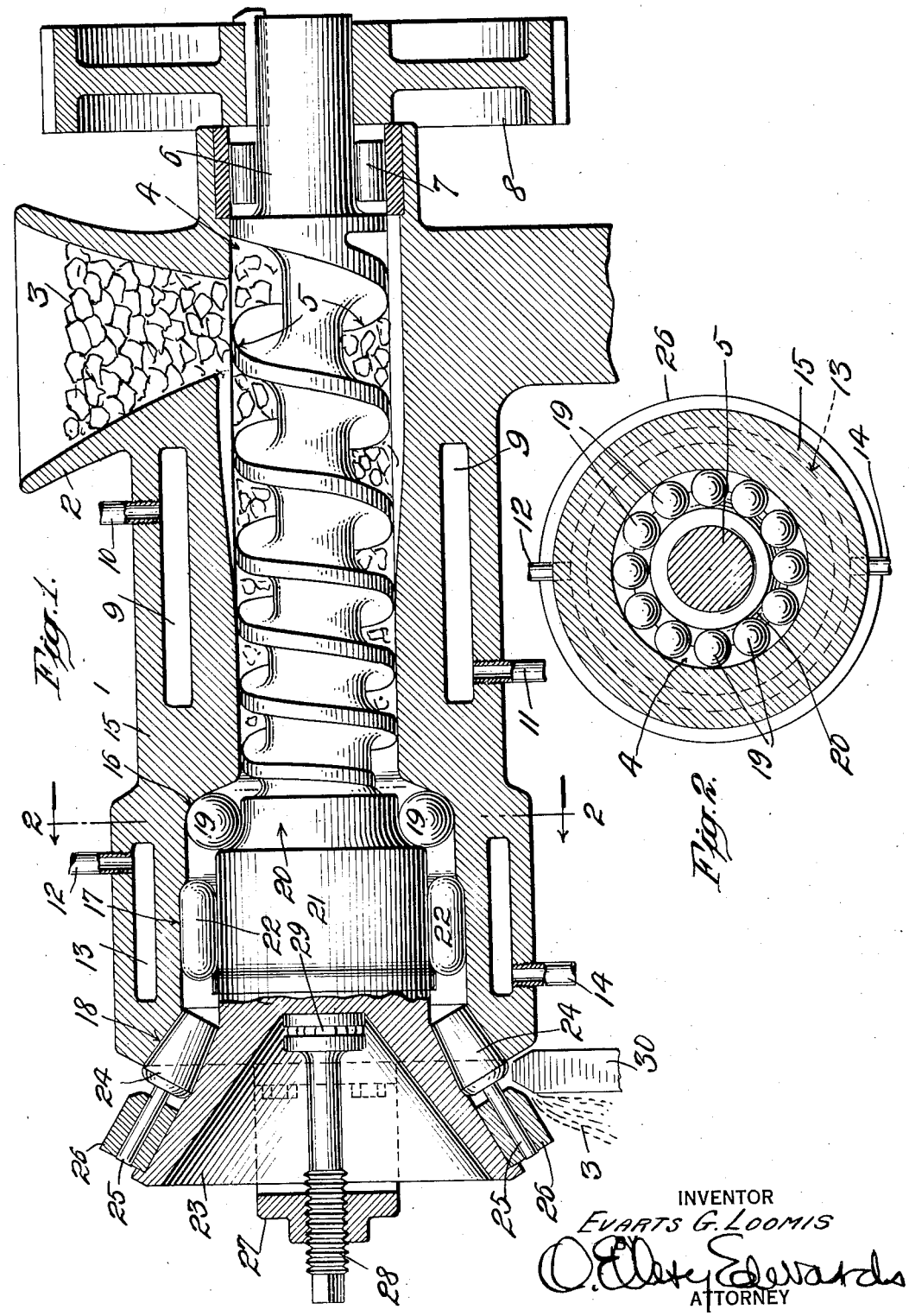
INVENTOR
EVARTS G. LOOMIS
ATTORNEY Patented May 29, 1934

1,960,708

UNITED STATES PATENT OFFICE 1,960,708

MEANS FOR CRUSHING VISCOUS AND OTHER SUBSTANCES

Evarts G. Loomis, Newark, N. J.

Application December 8, 1928, Serial No. 324,599

4 Claims. (Cl. 83—22)

The object of my invention is to mix and positively force viscous and other substances under crushing rollers, balls or other means, so that such substances may be made free of all lumps, or other solid matter, of more than a predetermined diameter. This object is accomplished by my invention, one embodiment of which is hereinafter more particularly set forth.

For a more detailed description of my invention, reference is to be had to the accompanying drawing, forming a part hereof, in which Figure 1 is a longitudinal section of a machine embodying my invention and capable of carrying out the process hereinafter disclosed.

Figure 2 is a sectional view, taken on the line 2—2 of Figure 1, looking in the direction of the arrows.

Throughout the various views of the drawing, similar reference characters designate similar parts.

My improved machine 1 has a hopper 2 which receives any suitable material 3 which may be viscous, granulated, or what not, and even fluid, and this material falls to a chamber 4 in which revolves a suitable screw 5 of the conventional type, known as an Archimedean screw, or any other suitable conveyor, although such a screw is preferred because of its simplicity. This screw is driven by a shaft 6 mounted on roller or other bearings 7 and driven by a gear 8 or other suitable means, as is apparent. The chamber 4 is surrounded by a heating or cooling chamber 9 with an inflow pipe 10 and an outflow pipe 11 so that the material about the screw can be heated during the process of passing to the rollers described below, or it may be cooled, as may be appropriate, or, if desired, it may be both heated and cooled. A similar pipe 12 also supplies either heating or cooling fluids to a chamber 13 about one set of rollers described below, and these heating or cooling fluids may be removed by another pipe 14, as is obvious. The casing 15 in which these chambers are formed, as well as the hopper 2, is also provided with three bearings 16, 17 and 18, as many such bearings being made as desired, and in the preferred embodiment of my invention, these bearings have increasing diameter as the material approaches the end of the shaft remote from the driving wheel 8 so that after this driving wheel is removed and after some other parts are removed that are described below, the screw 5 and connected parts may be bodily removed from the frame 15.

In the embodiment shown, the bearing or race 16 has balls 19 running thereon and in a corresponding groove 20 which forms an integral part of the screw 5. Another integral part of this screw is the cylindrical bearing 21 on which is mounted a set of rollers 22 which run in the race 17. These rollers preferably have semi-spherical ends so as to be easily cleaned and facilitate the rolling of material passing through them. At the extreme end of the screw 5 is a flared conical part 23 which has a conical portion adapted to engage rollers 24 which run on the conical race 18 of the casing 15. The rollers 24 may be provided with spindles 25 that turn in a spacer 26 on the conical part 23. When viscous material is run through the hopper 2 and fed by the screw 5 to the rollers 19, 22 and 24, the resistance which this material offers to the rotation of the screw causes the rollers to ride tight against their bearings so that these rollers will grind and pulverize the material passing under them. If the material be not viscous, these rollers will not be forced so firmly against their bearings and in this event additional pressure may be required. To provide this, a bracket 27 is fixed to the frame 15 of the machine and in this bracket is a screw 28 which may be turned against the ball thrust bearing 29 so that the balls of this bearing are between the conical part 23 and the screw 28 so that any desired pressure may be brought to bear on the rollers 24, 22 and 19.

In any event, the material 3 which passes through the machine after being pressed by the rollers 24, is expelled from the apparatus and it may be sufficiently viscous to cling to the spacer 26 and other adjacent parts. To prevent an undue amount of such material from accumulating, a scraper 30 is provided which is fixed to the frame 15, or any other convenient means, so as to remove this material and let it fall clear of the apparatus.

In view of the foregoing, the operation of my apparatus will be readily understood. The material 3, no matter how viscous, passes to the worm 5 and by the rotation of this worm and against the friction due to this material engaging the worm and the walls of the chamber 4, it is mixed and forced under pressure under the rollers 19, 22 and 24, as above described, and finally leaves the apparatus at the end remote from where it entered and this material may be either heated or cooled or both through the action of the fluids supplied for the purpose in the chambers 9 and 13.

While I have shown and described one embodiment of my invention, it is obvious that it

Having thus described my invention, what I claim is:

1. Means for crushing and mixing viscous and other substances comprising a feed chamber, a rotor positioned at the outlet end of the feed chamber and constituting an inner race, means connected to said rotor for rotating the same, an outer race adjacent the periphery of said rotor, and several series of crushing and mixing rollers spaced from one another and positioned between the rotor and outer race.

2. Means for crushing and mixing viscous and other substances comprising a feed chamber, a rotor positioned at the outlet end of said feed chamber and constituting an inner race, means for rotating said rotor, an outer race adjacent the periphery of said rotor, and several series of crushing and mixing rollers spaced from one another and positioned between the rotor and outer race, the rollers of one series being of different form from those of the other series, the rollers constituting bearing members for said rotor.

3. Means for crushing and mixing viscous and other substances comprising a feed chamber, a rotor positioned at the outlet of said feed chamber and constituting an inner race, means for rotating said rotor, a conical member carried by the rotor, a portion complementary to the conical member, cal member surrounding the conical member, several spaced series of rollers interposed between the conical member and the complementary portion, and pressure means operative axially of the rotor for forcing the conical member and rollers toward the complementary portion.

4. Means for crushing and mixing viscous and other substances comprising combined feeding and pressure means, a plurality of successively arranged roller groups to which the substance is directly fed under pressure by the feeding and pressure means, each of said roller groups being arranged for rotation in its own race, and pressure means operative axially of one of the roller groups for forcing said group toward the other groups.

EVARTS G. LOOMIS.